March 1, 1927.  1,619,620
P. G. LIGHT
HAY MOWING MEANS
Filed Oct. 24, 1925

Inventor
Purl G. Light,
By Clarence A. O'Brien
Attorney

Patented Mar. 1, 1927.

1,619,620

UNITED STATES PATENT OFFICE.

PURL G. LIGHT, OF EXETER, NEW YORK.

HAY-MOWING MEANS.

Application filed October 24, 1925. Serial No. 64,656.

My present invention pertains to means for handling hay and the like; and it has for its general object the provision of simple and inexpensive means whereby hay may be handled and placed in a barn or analogous structure with but a minimum amount of effort on the part of the operative.

To the attainment of the foregoing, the invention consists in the improvement as hereinafter described and definitely claimed.

In the accompanying drawings, forming part of this specification:—

Similar numerals of reference designate corresponding parts in all of the views of the drawings.

Figure 1:
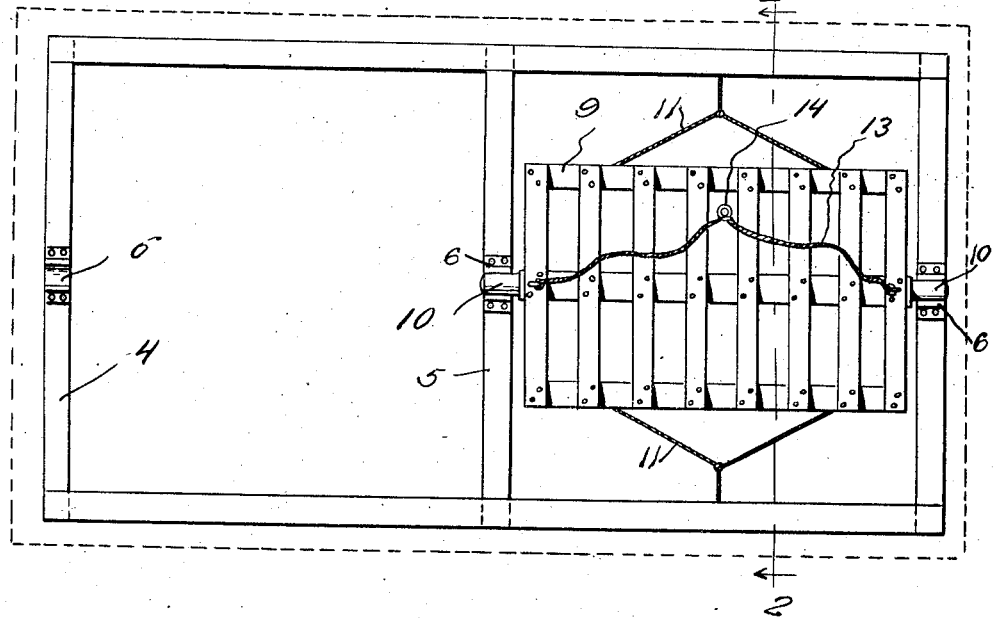
Figure 1 is a top plan view of a structure in accordance with my invention, designed to be used in a barn or similar structure below the roof thereof.
Figure 2:
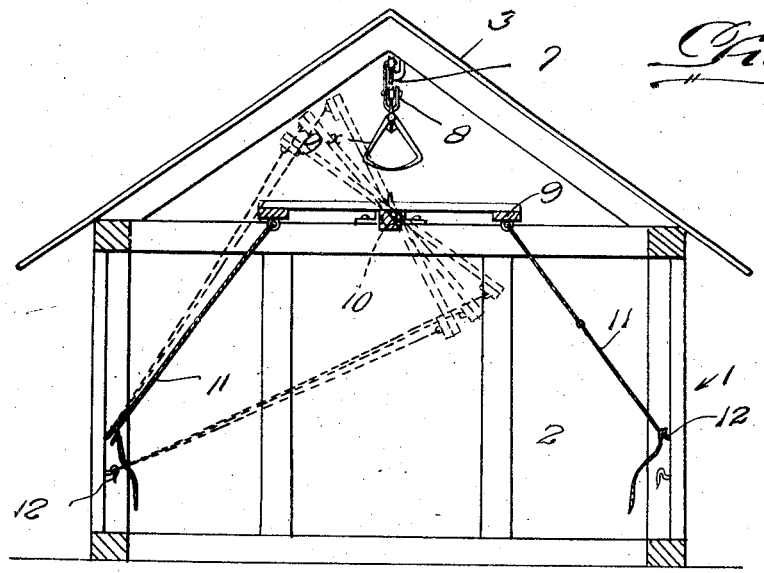
Figure 2 is a vertical transverse section taken in the plane indicated by the line 2—2 of Figure 1, looking in the direction of the arrows.
Figure 3:
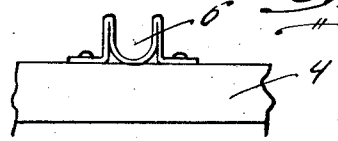
Figure 3 is a detail view on an enlarged scale of one of the bearings of the trunnions of the mower member of my improved means.

As shown in Figure 2 the barn structure is provided with sides 1, and ends 2 and a roof 3, and in the barn structure is included a rectangular frame having end cross bars 4 and an intermediate cross bar 5, the said bars 4 and 5 having superposed on and fixed thereto bearings 6, Figures 1, 2 and 3, arranged in line in the longitudinal center of the barn as appears in Figure 1.

Carried by the roof 3 adjacent to the ridge thereof is a longitudinal track rail 7, and movable on the said rail 7 is a traveller 8 with which is associated a grapple 9ˣ and a cable for raising and lowering the said grapple and for moving the same with the traveller; the said traveller and the said grapple being by preference of the ordinary well known construction though they may be of any other construction appropriate to my invention inasmuch as they do not form part of the latter.

At 9 is the mower member of my improvement, the said member 9 being preferably of rack or open work form for the sake of lightness. At its ends the said mower member 9 is provided with trunnions 10, removably arranged in bearings 6, and by comparison of Figures 1 and 2 it will be noted that cables 11 are connected to opposite side portions of the member 9 and are designed to be engaged with hooks or other appropriate keepers 12 on the opposite sides of the barn structure when the member 9 is not in use.

Above the mower member 9 is a cable 13 connected to the end portions of the mower member and equipped at 14 with an eye or other appropriate means for effecting connection of the said cable 13 to the before mentioned traveller, as when it is desired to shift the mower member 9 from the bearings in which it is shown as resting in Figure 1 to the bearings at the opposite end of the barn structure.

It will be readily understood from the foregoing that the mower member 9 is rockable transversely or in the direction of the width of the barn structure, and with this understanding the practical advantages of my particular improvement will be readily appreciated.

Incident to the practical use of the improved means, the first four loads of the grapple or fork are deposited in a longitudinal series on one side portion of the member 9. While receiving loads of hay the member 9 is held against tipping by the cables 11 and the parts with which said cables cooperate, but it will be understood that the said mower member 9 is to be slightly pitched for the discharge of the said first quantity of hay placed thereon. The loading of the said side of the member 9 is then repeated, and for the discharge of the latter load the member 9 is tilted to a greater extent than when the first side of the bent is filled. The operations described are repeated and the tilting of the mower member 9 is effected to bring about the filling of the other side of the bent. Incident to these operations, the cables at the sides of the member 9 are, of course, manipulated as occasion demands. Subsequently to the depositing of hay in the opposite side portions of the barn in the same transverse plane as the member 9 to the extent desired, the cables 11 are released, and the cable 13 is connected with the before mentioned traveller and the cable complementary to the traveller and fork or grapple, and then the member 9 is moved to a position over the other end bearing 6 and the intermediate bearing and is permitted to gravitate until its trunnions are disposed in said bearings whereupon the operations before described may be repeated for the deposit of hay at opposite sides of the end portion of the barn structure in which the mower member 9 is then arranged.

It will be apparent that in the manner described the member 9 may be moved from the first named location to the second named location in a short space of time, and by a single operative and with but little effort on his part.

Obviously for the rocking manipulation of the member 9 practically no effort is required.

Notwithstanding the practical advantages ascribed to my novel means for the purpose indicated, it will be noted that the said means is simple and inexpensive in construction, and is susceptible of being expeditiously and easily installed in a barn or like structure at small cost.

It will be understood from the foregoing that in Figures 1 and 2 the mower member 9 is shown as idle, and when said mower member 9 is idle the cables 11 may be arranged as shown or may be arranged in any other manner designed by the party controlling the barn.

Incident to the dumping of hay, the mower member 9 and the cables may be positioned as shown by dotted lines in Figure 2, the cables being shown as extending to one side of the barn. Then for dumping on the opposite side of the mow the cables will all be changed to the opposite side of the barn and so on back and forth as the mow fills.

I have entered into a detailed description of the construction and relative arrangement of the parts embraced in the present embodiment of my invention in order to impart a full, clear and exact understanding of the said embodiment. I do not desire, however, to be understood as confining myself to the precise structure illustrated and described, my invention being defined by my appended claim within the scope of which modifications may be made without departure from my invention.

Having described my invention, what I claim and desire to secure by Letters-Patent, is:—

Hay mowing means comprising an overhead support, three, spaced longitudinally disposed and horizontal bearings in longitudinal alignment carried by said overhead support, an overhead longitudinal track disposed above and in the same plane as said alined bearings, a traveller on said track, a rockable and shiftable mower member having extending from its opposite ends longitudinal trunnions removably arranged in one pair of said bearings and shiftable from said pair of bearings to the other pair, means on the mower member for the connection of the same to the traveller for facilitating the said shifting of the mower member, a pendent cable on the mower member member, and means to which said cable is detachably connected for the holding of the mower member against casual lateral tipping.

In testimony whereof I affix my signature.

PURL G. LIGHT.